Figure 4:
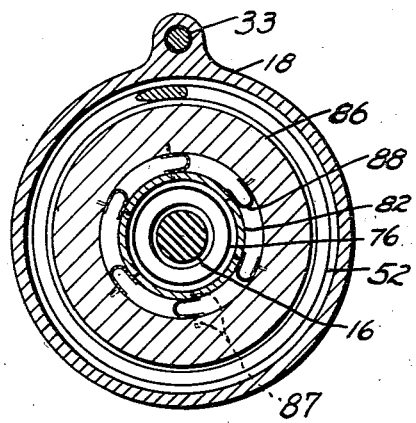

Sept. 10, 1957  C. W. CHILLSON  2,805,849
ACCELERATION RESPONSIVE MECHANISM
Original Filed Oct. 30, 1952  2 Sheets-Sheet 1
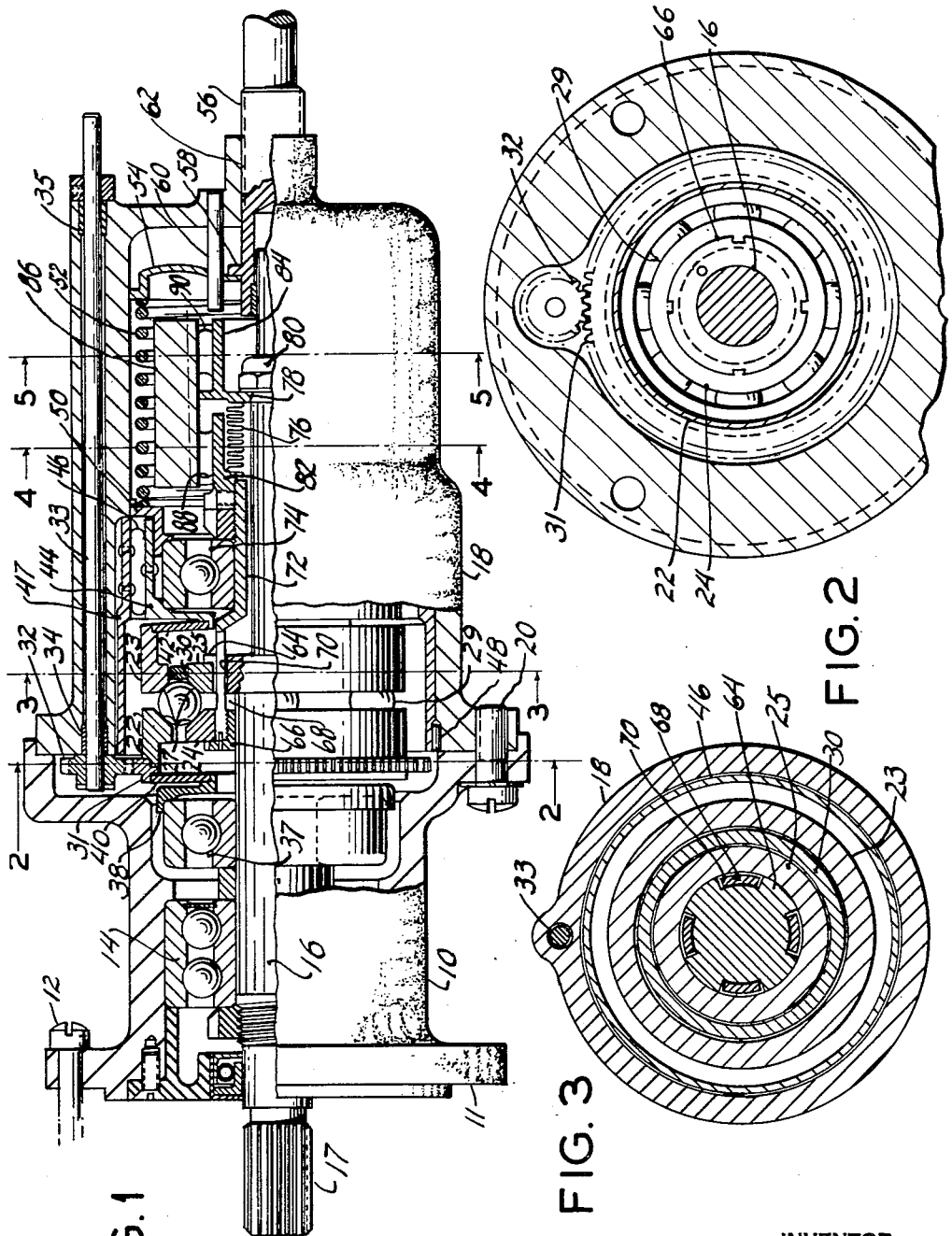
INVENTOR
CHARLES W. CHILLSON
BY *Godfrey B. Speir*
ATTORNEY Sept. 10, 1957   C. W. CHILLSON   2,805,849
ACCELERATION RESPONSIVE MECHANISM
Original Filed Oct. 30, 1952   2 Sheets-Sheet 2

INVENTOR
CHARLES W. CHILLSON
BY
ATTORNEY

2,805,849

Patented Sept. 10, 1957

2,805,849

ACCELERATION RESPONSIVE MECHANISM

Charles W. Chillson, Caldwell, N. J., assignor to Curtiss-Wright Corporation, a corporation of Delaware Original application October 30, 1952, Serial No. 317,705, now Patent No. 2,755,078, dated July 17, 1956. Divided and this application January 20, 1954, Serial No. 405,165

10 Claims. (Cl. 264—1)

This invention relates to speed controlling governors and is concerned particularly with improvements in centrifugal governors incorporating acceleration stabilization. This application is a division of application Serial No. 317,705 filed October 30, 1952, now Patent Number 2,755,078 issued July 17, 1956.

The governor of this invention comprises, in general, a plurality of relatively movable ball races and a row of balls between the races and engaged therewith. One of the races comprises an input member driven by the machine whose speed is to be controlled, another constitutes a reaction member, and another, a speed control output element. One of the races is controlled by an acceleration sensor incorporated in the governor. The ball and race organization constitute a variable ratio transmission. The balls, in their rotation, develop centrifugal force tending to hurl them outwardly and to displace the races axially, this tendency being counteracted by the force of a governor speeder spring. The shift in race position due to unbalance of these forces produces change in rotational position of the output race, such rotation being usable for control of speed.

An object of the invention is to provide a compact, unitary governor assembly, with acceleration response, with an output element which is positively driven with sufficient power to enable the development of speed correcting signal forces without the use of sensitive servomechanisms. A further object of the invention is to provide a powerful governing system of purely mechanical construction which may be used for the speed control of a wide variety of mechanisms, the governor deriving the power for speed control directly from the machine whose speed is to be controlled. A further object is to provide a governor incorporating a speed and acceleration sensing system including frictionally driven ball elements.

Figure 5:
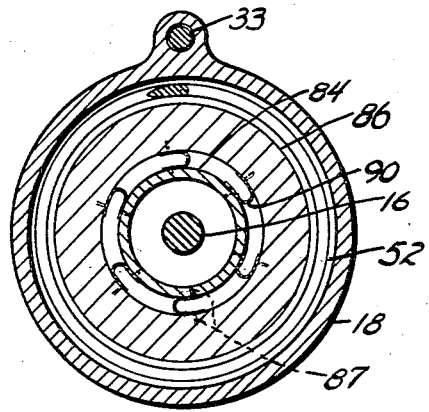
Figure 6:
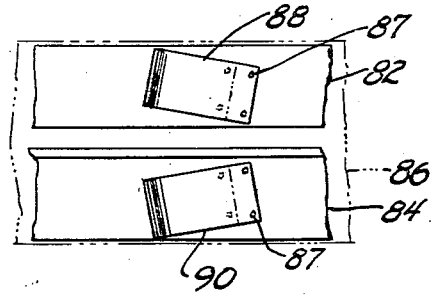

The specific nature and construction of a preferred embodiment of the invention is described in detail below in connection with the annexed drawing wherein similar reference characters indicate similar parts and wherein:

Fig. 1 is a longitudinal, partly sectional view of the governor;

Figs. 2, 3, 4 and 5 are respectively sections on the lines 2—2, 3—3, 4—4, and 5—5; and Fig. 6 is a phantom view, on the line 6—6 of Fig. 1, projected into a plane to show the operation of a part of the invention.

The preferred arrangement of the invention as described herein is subject to all reasonable design modifications, the scope of the invention being defined in the claims.

In the drawings, 10 is a part of the governor housing which includes a mounting flange 11 adapted to be secured as by screws 12 to a corresponding mounting pad on a prime mover or other mechanisms to be controlled. The housing 10, through bearings 14, supports a main governor shaft 16 provided with a drive coupling 17 adapted to be engaged with a governor drive element of the prime mover. A second housing 18 is secured to the housing 10 by screws 20, the housing 18 containing the essential elements of the governor. The governing sub-assembly comprises ball races 22, 23, 24 and 25 which have balls contacting faces 27 between which a plurality of balls 29 are disposed, the balls being held in circumferentially spaced relation by a retainer 30. The faces 27 are so profiled, preferably, that the races 22 and 25 have no relative movement in an axial direction, nor do the races 23 and 24. However, the race pairs 22, 25 and 23, 24 are relatively axially movable to enable the balls 29 to move radially inwardly or radially outwardly while remaining in contact with all four ball race surfaces. The configuration of race faces 27 to attain ratio changes is more clearly shown in Chillson et al. application Serial No. 228,444 filed May 26, 1951, now Patent Number 2,696,888 issued December 14, 1954. Preferably the faces of each race pair are in the form of concentric arcs. The ball races 24 and 25 rotate together; the race 23 is non-rotating, and the race 22, driven by the others through the balls, rotates or not depending on the relative positions of the several races.

The outer ball race 22 engages an output gear 31 concentric with the shaft 17, which drives an output pinion 32 whose shaft 33 is borne in bushings 34 and 35 in the housing 18. The shaft 33 comprises the governor output shaft which may be connected in any suitable manner to a speed controlling mechanism for the prime mover which drives the governor. The race 22 is further carried for rotation and for substantially fixed axial position by an antifriction bearing 37 whose inner race is mounted on the shaft 16 and whose outer race engages an adapter 38 which supports the inner rim of a spring washer 40, the outer rim of the washer 40 being engaged with an annular recess on the hub of the gear 31. By this construction, the race 22 is free to rotate under control influences to be described, while being constrained against axial movement by the bearing 37.

The race 23 comprises a non-rotating reaction member for the governor assembly, the race, however, being axially movable under control influences. The race 23 is carried by the outer edge of a spring washer 42 whose inner edge is supported in an annular adapter 44. The adapter 44 is constrained against rotation relative to the housing 18 by spring strips 46 extending longitudinally of the governor and disposed between and secured to the adapter 44 and a sleeve 47, the latter sleeve being keyed to the housing 18 by a pin 48. The strips 46 provide a relatively friction-free means to allow relative axial movement but no relative rotation. The righthand end of the adapter 44 engages a spring seat 50 which in turn is engaged by the left end of a governor speeder spring 52. The right end of the speeder spring 52 engages a cup 54 which is adjustable axially of the governor by a control shaft 56 having a flange 58 engaging the cup. The cup is held from rotation by a pin 60 seated in the housing 18 and slidable in a hole in the cup. The flange 58 forms a simple thrust bearing and enables the control shaft 56 to be rotated relative to the cup. The control shaft 56 has screw thread engagement with the housing 18 so that rotation of the control shaft 56 moves the cup 54 rightwardly or leftwardly to unload or load the speeder spring 52. The terms left and right used herein refer only to the disposition of parts as shown in the drawings and infer no limitations in the arrangement of the parts.

The inner ball races 24 and 25 are coupled to rotate together with the drive shaft 16. Race 24 is arranged to move axially with respect to the drive shaft 16 and with the race 23, in response to speed errors and acceleration or deceleration of the shaft. It will be seen that the ball race 25 is seated on a flange 64 on the shaft 16 so that its rotation with the shaft is assured and so that it is anchored against axial movement with respect to the shaft. Thus, the ball races 22 and 25 are fixed in their axial position; the ball race 25 rotates with the shaft 16 while the ball race 22 may rotate as controlled by the action of the system. The ball race 24 is secured by an internal nut 66 to a plurality of fingers 68 extending rightwardly through notches 70 formed in the flange 64. The fingers 68 are integral with a sleeve 72 which forms a mounting for the inner race of an anti-friction bearing 74, the outer race of the latter being engaged with the adapter 44 and the spring seat 50. The bearing 74 enables relative rotation between the sleeve 72 and the adapter 44 but holds them against relative axial movement whereby the ball races 23 and 24 may rotate relatively to one another but are constrained to joint axial movement under the influence of the speeder spring 52 and under the influence of the accelerometer to be described.

It will be noted that the races 22 and 25 while constrained against relative axial movement, are loaded against the balls 29 by the spring washer 40, to establish driving contact at opposite ends of diameters of the balls. In the same manner, the races 23 and 24 while relatively rotatable, are loaded toward each other and into driving contact with the balls 29 by the spring washer 42. The sleeve 72 is secured for rotation with the shaft 16, and for free axial movement relative thereto through a bellows coupling 76 secured at its left end to the sleeve 72 and at its right end to a flange 78 secured to the shaft 16 by a nut 80.

Surrounding the coupling 76 is a cylinder 82 secured to the sleeve 72 and rotatable therewith. Formed integrally with the flange 78 is a cylinder 84 which is locked rotationally and axially relative to the shaft 16. Between the cylinders 82 and 84, and the inside of the speeder spring 52, is a flywheel or seismic mass 86 which constitutes an acceleration sensor element. This mass is spaced from the cylinders and coupled by elastic strips 88 and 90 to the cylinders 82 and 84 respectively in a manner to be described, so that when the mass 86 rotates relatively to the cylinders 82 and 84, the cylinder 82 will be moved axially with respect to the cylinder 84. If rotation of the shaft 16 is uniform, the mass 86 will rotate uniformly therewith whereupon the axial position of the cylinders 82 and 84 will remain constant.

Particular reference may be made to Figs. 4, 5 and 6 which amplify the disclosure of the coupling between the cylinder 84, the mass 86 and the cylinder 82. Figs. 5 and 6 show the cylinder 84 around which are secured the plurality of thin flexible metal strips 90 each of which is formed in the shape of a U. The inner limb of each strip is secured to the cylinder 84 and the outer limb of each strip is secured to the surface of the mass 86 by pins 87. The strips 90 are sloped helically as shown in Fig. 6 so that if there is relative rotation between the cylinder and mass they are axially shifted relative to each other. Similar disposition to augment relative axial movement is made of the strips 88 between the cylinder 82 and the mass 86 the strips being secured by pins 87. When the strips are sufficiently flexible, thickness-wise, there is virtually frictionless support of the mass on the cylinders with little resistance to relative rotation. Yet when relative rotation exists between the cylinders and the mass the edgewise stiffness of the strips 88 and 90 enforce the desired axial movement. For a given angular displacement of the mass 86 relative to the cylinders, the cylinders will be moved toward or away from one another in an axial direction a certain distance, the mass 86 traveling axially half that distance if the strips 88 and 90 are symmetrically sloped as shown.

The assembly 82 to 90 constitutes an acceleration sensor wherein the cylinder 82 is moved axially with respect to the cylinder 84 in accordance with acceleration or deceleration of the cylinder 84 relative to the mass 86. Thus, acceleration and deceleration of the shaft 16 imposes axial force on the races 23 and 24 in addition to the force exerted upon those races by the speeder spring 52 and by the axial component of centrifugal force exerted by the balls 29. The mass 86, the helical lead of the strips 88 and 90, and the allowable angular movement between the mass 86 and the sleeve 84, are so designed as to cause shift from one limit of axial movement to the other of the races 23, 24 upon maximum expected acceleration or deceleration of the system.

Operation of the governor is outlined as follows. Let it be assumed that the prime mover is at rest and that the governor is set, through the adjusting shaft 56, to call for a certain speed. In this condition, the speeder spring 52 will have shifted, or will urge the races 23 and 24 leftwardly and the balls 29 will lie in a leftward and inward location toward the governor axis. When the machine is started, the shaft 16 rotates and accelerates, rotating the races 24 and 25. During acceleration, the mass 86 lags rotation of the shaft 16 and urges the races 23 and 24 rightwardly in a direction to diminish the effect of the speed error.

The races 24 and 25 drive the balls 29 against the non-rotating race 23, forcing the race 22 to rotate since the point of contact of the balls with the race 22 is offset in a radial direction from the point of contact of the balls with the non-rotating race 23. Rotation of the race 22 causes rotation of the control shaft 33 to a position calling for speed increase of the rotating system.

As the speed of the prime mover increases, the balls 29 are rotated not only about their own centers but in an orbit around the shaft 16 defined by the several races 22—25. With this orbital movement, the balls are whirling in a centrifugal field and tend to move radially outwardly. Their motion, due to the axially fixed race 22, tends to force the races 23 and 24 to the right to balance the force due to acceleration and the compression of the speeder spring 52. Final balance restores the acceleration sensor mass 86 to a mid-angular position relative to the sleeves 82 and 84. During this rightward movement the control race 22 turns to a position representing the required speed correction. The race 22 stops turning when the points of contact of the balls 29 with the race 22 lie opposite the points of contact of the balls with the race 23. This becomes the equilibrium position and control effects from the shaft 33 on the prime mover terminate.

When the machine is operating on-speed, the rightward component of centrifugal force on the balls 29 balances the force of the speeder spring 52. Either through readjustment of the speed setting of the adjusting shaft 56 or through an exteriorly caused change in speed of the prime mover driving the governor, a speed error is created causing an unbalance between the force of the speeder spring and of the rightward component of centrifugal force from the balls 29. The acceleration or deceleration of the shaft 16 causes a lag or lead of the mass 86 with respect to the shaft causing an axial force on, and shift of the races 23 and 24, in addition to the axial shift of those races resulting from the aforesaid force unbalance due to speed error alone. These two factors modify the ratio of the transmission composed of the races 22—25 and the balls 29 and cause rotation of the race 22 in a direction which turns the shaft 33 to impose a speed correction upon the prime mover in a direction to restore the speed of the prime mover to the desired speed. Again, as the desired speed is attained through the anticipating effect yielded by the acceleration sensor and the centrifugal force on the balls 29, the ratio of the transmission is restored to that at which the race 22 ceases rotation.

It will thus be seen that an acceleration or deceleration correction is super-imposed on the required speed correction which will bring the machine back to the on-speed condition with minimum time lag, suppressing overshooting of the speed correction and rendering the governor extremely stable.

Since the races are loaded against the balls 29 by spring washers 40 and 42, the power with which the governor can drive the speed adjusting shaft 33 is not limited by the pressure exerted by the speeder spring 52. Consequently, the governor can produce a considerable amount of torque in the output shaft 33, which is capable of operating directly a suitable speed changing mechanism for the prime mover. There is no need to interpose a mechanism, which is usually required, to amplify the minute force produced by the conventional speed sensing device to a force which is capable of operating a speed changing mechanism.

The governor of this invention remains comparable to prior types of governor whose output power is small. When the needed auxiliary equipment is included with the prior type governor, my new governor provides an overall advantage in weight and bulk.

Though one embodiment of the invention is shown, it is to be understood that the invention may be applied in various forms and in various environments. Changes may be made in the arrangements shown without departing from the spirit of the invention. Reference should be had to the appended claims for definition of the limits of the invention.

What is claimed is:

1. In a mechanical acceleration sensing mechanism for a rotating body, a shaft coupled to the body to rotate therewith, a sleeve rotatable with said shaft and movable axially relative thereto, acceleration responsive means comprising a flywheel embracing said shaft and free to float rotationally relative thereto, a yieldable strip of U form having one limb thereof secured to said shaft and the other limb secured within and to said flywheel, and another yieldable strip of U form having one limb secured to the sleeve and the other limb secured within and to said flywheel.

2. In a mechanical acceleration sensing mechanism for a rotating body, a shaft coupled to the body to rotate therewith, a sleeve rotatable with said shaft and movable axially relative thereto, acceleration responsive means comprising a flywheel embracing said shaft and free to float rotationally relative thereto, a yieldable strip of U form having one limb thereof secured to said shaft and the other limb secured within and to said flywheel, and another yieldable strip of U form having one limb secured to the sleeve and the other limb secured within and to said flywheel, at least one of said strips being acutely angularly disposed relative to the axis of said flywheel.

3. In a mechanical acceleration sensing mechanism for a rotating body, a shaft coupled to the body to rotate therewith, a sleeve rotatable with said shaft and movable axially relative thereto, acceleration responsive means comprising a flywheel embracing said shaft and free to float rotationally relative thereto, a yieldable strip of U form having one limb thereof secured to said shaft and the other limb secured within and to said flywheel, and another yieldable strip of U form having one limb secured to the sleeve and the other limb secured within and to said flywheel, said strips being acutely angularly disposed relative to the shaft axis between the shaft and flywheel, and between the flywheel and sleeve, respectively.

4. An axial shifter for two rotating members in end to end relation and mounted for axial movement relative to each other, comprising a member embracing both of said two members, and U-shaped strips between the embracing member and respective other members, one limb of each U-shaped strip being secured to the embracing member and the other limb being secured to one of the rotating members, said strips being acutely angularly disposed relative to the axis of rotation.

5. An axial shifter for two rotating members in end to end relation, said members being axially movable relative to each other, comprising a member embracing both of said two members, U-shaped strips between the embracing member and respective other members, one limb of each U-shaped strip being secured to the embracing member and the other limb being secured to one of the rotating members, said strips being acutely angularly disposed relative to the axis of rotation, said embracing member comprising a flywheel mass, one of said rotating members comprising a driving member, and said other rotating member being responsive in its axial movement to the rotational acceleration and deceleration of said driving member.

6. In a control system comprising a rotating shaft member subject to rotational acceleration and deceleration, an acceleration sensor comprising a flywheel supported upon said member for rotation therewith and with respect thereto, and means coupling said flywheel to said member for moving said flywheel axially relative to said member in response to relative rotation of said member with respect to said flywheel, said means comprising a plurality of folded ribbon-like spokes each of substantially U form, the limbs of said U spokes being respectively secured to said member and to said flywheel in acutely angled relation to the axis of the system.

7. In a control system comprising a rotating shaft member subject to rotational acceleration and deceleration, an acceleration sensor comprising a flywheel supported upon said member for rotation therewith and with respect thereto, and means coupling said flywheel to said member, said means comprising a plurality of folded ribbon-like spokes each of substantially U form, the limbs of said U spokes being respectively secured to said member and to said flywheel in acutely angled relation to the axis of the system, said spoke limbs of each spoke being organized to change in effective relative to each other upon relative rotation between the member and flywheel and upon such change in effective length, due to the angled disposition of said spokes, shifting said flywheel axially relative to said member upon relative rotation between said member and flywheel.

8. An acceleration sensor for a rotatable member comprising a hollow flywheel embracing the member, and a helical screw shift connection between the flywheel and member for effecting axial flywheel movement in response to relative rotation between the flywheel and member, said screw shift connection comprising a plurality of ribbon-like supports each of U form having their inner limbs secured flatwise to the member and their outer limbs secured flatwise within the flywheel, said supports being disposed in acutely angled relation to the member axis.

9. An acceleration sensor for a rotatable member comprising a hollow flywheel embracing the member, and a screw shift connection between the flywheel and member for effecting axial flywheel movement in response to relative rotation between the flywheel and member, said screw shift connection comprising a plurality of ribbon-like supports each of U form having their inner limbs secured flatwise to the member and their outer limbs secured flatwise within the flywheel, said supports being disposed in acutely angled relation to the member axis, said supports having a high degree of stiffness transversely thereof, and a lower degree of thickness stiffness as said limbs of each support change in effective length relative to each other upon relative rotation of said member and flywheel.

10. An acceleration sensor for a rotatable member comprising a hollow flywheel embracing the member, and a screw shift connection between the flywheel and member for effecting axial flywheel movement in response to relative rotation between the flywheel and member, said screw shift connection comprising a plurality of relatively wide, thin bands, the bands being stiff transversely due to their width and being readily yieldable in bending, the ends of said bands being doubled upon one another to form loops and limbs extending from said loops, the loops being disposed between the flywheel and member and the limbs being secured respectively to the flywheel and member, said bands being acutely angled disposed to the member axis.

References Cited in the file of this patent

UNITED STATES PATENTS

| | | |
|---|---|---|
| 158,300 | Muchin | Dec. 29, 1874 |
| 2,140,620 | Farmer | Dec. 20, 1938 |